Sept. 21, 1965 J. BRODECK 3,207,526
COLLAPSIBLE CART
Filed May 13, 1964 2 Sheets-Sheet 1

INVENTOR
JOHN BRODECK
BY
ATTORNEY

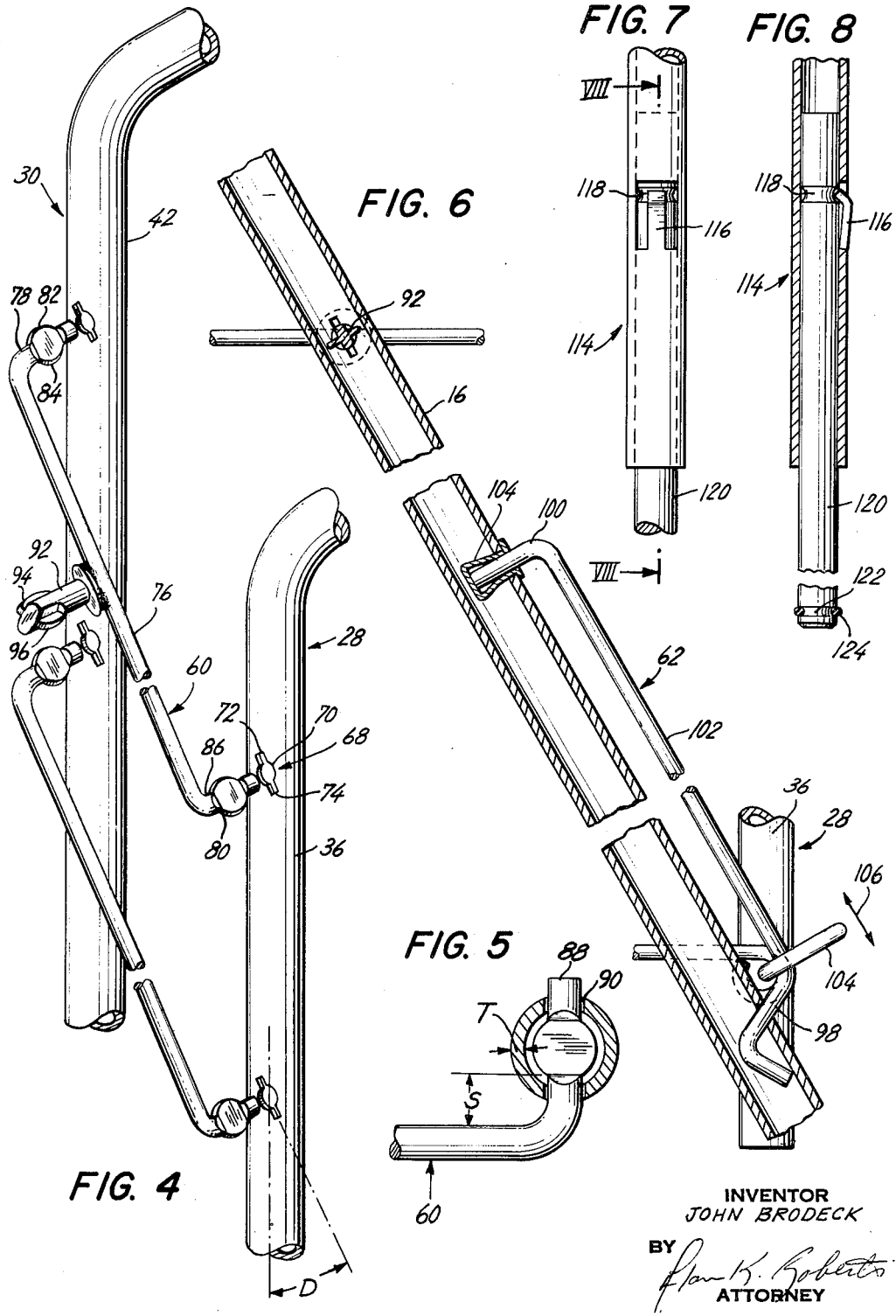

United States Patent Office
3,207,526
Patented Sept. 21, 1965

3,207,526
COLLAPSIBLE CART
John Brodeck, 730 Woodland Ave., Oradell, N.J.
Filed May 13, 1964, Ser. No. 367,101
13 Claims. (Cl. 280—36)

This invention relates to collapsible structures and more particularly to collapsible shopping carts.

It is a general object of the invention to provide improved collapsible structures and techniques for manufacturing the same.

More specifically, it is an object of the invention to provide improvements in collapsible shopping cart constructions.

In accordance with one of the various aspects thereof, the invention is concerned with a problem of the prior art whereby welding or bending operations or the like are required for assembly operations.

In this regard, it is an object of the invention to provide an improved structure for which the elements can be separately fabricated and then assembled without requiring deformation of the elements in any way whatsoever for purposes of assembly.

Still a further object of the invention relates to the provision of structures and techniques which are both economical and well adapted to mass production requirements.

To achieve the above and other objectives of the invention, there is contemplated an embodiment of the invention in accordance with which a collapsible cart is provided which comprises pivotally connected members constituting a collapsible cage, said members being detachable from one another upon assuming a predetermined angular relationship, there being further provided guide means operatively associated with the aforesaid members to limit relative movement therebetween to exclude the aforesaid predetermined relationship while at the same time establishing open and closed conditions for the said collapsible cage.

In accordance with another aspect of the invention, there is contemplated the provision of a collapsible cart comprising a support frame having pivotally connected thereto a collapsible cage adjustable between open and collapsed conditions, there being provided key means which lock the collapsible cart to the support frame, the key means providing detachment of these elements upon the assuming of a predetermined relationship therebetween, there being moreover provided means which both guide the cage between the open and collapsed conditions thereof and prevent the assuming of the aforesaid predetermined positional relationship.

More specifically, there is contemplated, in accordance with a preferred embodiment of the invention, a collapsible shopping cart comprising an inverted U-shaped tubular support frame including two legs between which is positioned a collapsible cage pivotally connected thereto. This cage includes front and back tubular frames having wire lattices connected thereto for purposes of article retention. These frames are provided with arrays of keyway holes including slots having a predetermined angle disposition. Moreover, there are comprised lateral members pivotally connected to the front and back frames by means which cooperate with the keyway holes to permit engagement between these elements with the elements relatively disposed within a predetermined range of angular relationships. At the same time, there is a keyed relationship between the support frame and the cage which is also effective between the limits of said range.

In this embodiment there is contemplated the provision of a guide assembly having a dual function. One of the functions of this guide arrangement is to render the collapsible cage displaceable relative to the frame along a predetermined path. Another function is to limit the displacement between the elements constituting the cage such that these elements cannot become detached from one another.

According to the techniques prescribed in accordance with the invention, the cage elements are functionally positioned at an angle relationship whereby they may be connected to one another, whereafter they are displaced to an operative range of angular relationship wherein they can serve as a collapsible cage and wherein said elements cannot be detached from one another.

The aforesaid objectives and features of the invention will be more clearly understood from the following detailed description of a preferred embodiment of the invention as illustrated in the accompanying drawing in which.

Figure 1:
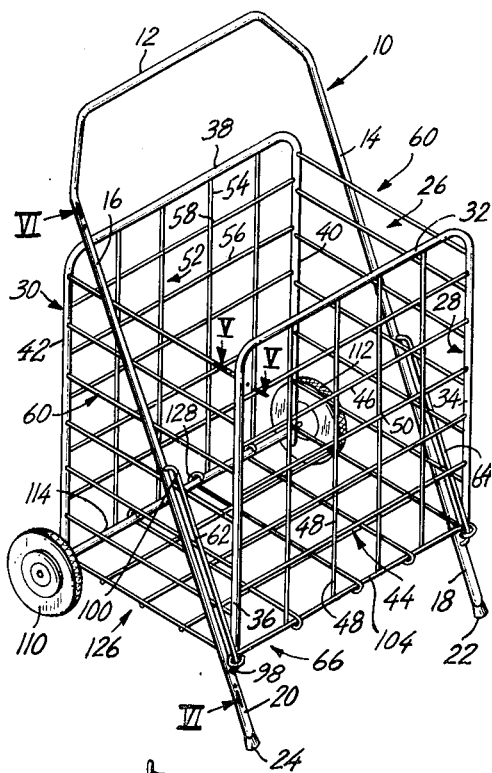
FIG. 1 is a perspective view of a collapsible shopping cart provided in accordance with said preferred embodiment of the invention.
Figure 2:
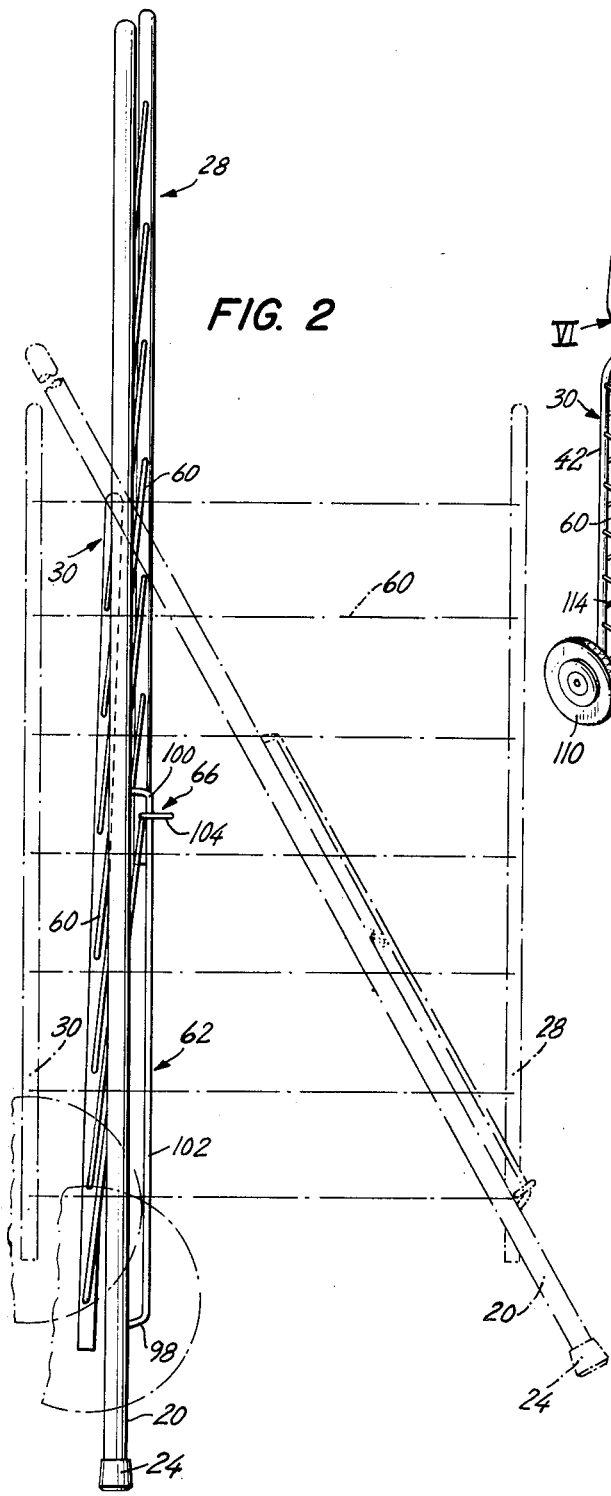
FIG. 2 is a side view of the cart of FIG. 1 in collapsed condition, this view further showing, by the use of phantom lines, the collapsible cage in open condition.
Figure 3:
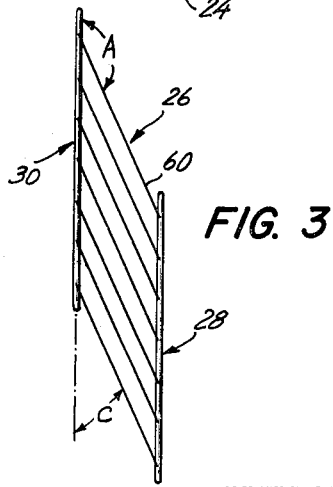

FIG. 3 diagrammatically illustrates in side view the angular relationship between various elements of the collapsible cage of FIGS. 1 and 2 with these elements in position for being attached to one another;

FIG. 4 is an exploded fragmentary view of selected of the elements of the aforesaid collapsible cage aligned for purposes of assembly;

FIG. 5 is a fragmentary view partially in section taken along line V—V of FIG. 1;

FIG. 6 is a fragmentary view partially in section taken along line VI—VI of FIG. 1;

FIG. 7 is a fragmentary view of a detachable connection provided for the wheels of the cart illustrated in FIG. 1; and FIG. 8 is a sectional view along line VIII—VIII of FIG. 7.

As has been stated above, collapsible shopping carts are provided, in accordance with the invention, which facilitate the assembling of the various component parts thereof without requiring deformation of these parts in any manner whatsoever.

In the drawing there is illustrated a collapsible structure in which the aforestated advantage of the invention is provided and which comprises generally an inverted U-shaped tubular frame 10 fabricated of a metal such as chromed steel or aluminum. Said support frame includes a generally horizontal central portion 12 which constitutes a handle and two legs 14 and 16 which depend from the central portion 12.

Legs 14 and 16 include downwardly directed free end portions 18 and 20 on which are mounted end caps 22 and 24 which may be fabricated of rubber or plastic and are intended to be ground engaging members upon which part of the weight of the assembly is supported.

Between legs 14 and 16 is supported a collapsible cage 26 which is pivotally connected to the frame 10. Said cage includes a generally vertical front tubular frame 28 and a generally vertical back tubular frame 30 which is parallel to the frame 28.

The front tubular frame includes a top horizontal portion 32 and two vertical side portions 34 and 36. Portions 32, 34 and 36 are preferably bent out of a single piece of tubing constituted, for example, of aluminum tubing or steel tubing which has been chrome plated.

Back frame 30 comprises a generally horizontal top portion 38 and generally vertical side portions 40 and 42, these component sections also being fabricated of a single piece of tubing as previously described relative to front frame 28.

Mounted on front frame 28 is a wire lattice 44 consisting of a plurality of horizontal wires 46 welded to vertical wires 48 at interstices 50. Said wires are preferably of chrome plated steel or the like. This lattice is provided for purposes of article retention or, in other words, to form an article retaining front for the collapsible cage. Canvas or the like can be substituted for the lattice if desired.

Similarly, rear or back frame 30 is provided with a wire lattice 52 including a plurality of vertical wires 54 welded to a plurality of horizontal wires 56 at interstices 58, these wires also being fabricated preferably of chrome-plated steel or the like, this lattice also serving for purposes of article retention.

As will be explained in greater detail hereinafter, side portions 34 and 36 of front frame 28 and side portions 40 and 42 of rear frame 30 are provided with corresponding rectilinear arrays of evenly spaced keyway holes wherein are pivotally accommodated the extremities of substantially rigid wire member 60.

Wire members 60 are operatively associated with the front and back frames 28 and 30 to constitute therewith a box-like structure having a right-quadrilateral cross-section which, in the preferred and illustrated embodiment of the invention, is substantially a square-shaped cross-section. Said wire members 60 are pivotally engaged with frames 28 and 30 to permit a relative displacement of the same towards and away from each other to permit the cage 26 to be extended or collapsed.

FIG. 2 illustrates, in solid lines, the collapsed condition of cage 26 in accordance with which frame 28 is displaced to a position proximate and parallel to rear frame 30, lateral side members 60 being displaced from the position of FIG. 1 (whereat they are perpendicular to the side portions 28 and 30) and assuming positions whereat they are aligned at relatively small acute angles relative to frames 28 and 30.

FIG. 2 illustrates, in phantom lines, a side view of the collapsible cart in open or extended condition whereat the front frame 28 is parallel to but substantially spaced from rear frame 30, the lateral side members 60 being aligned at right angles to said frames 28 and 30.

Also appearing in FIGS. 1 and 2 are guide rods 62 and 64, the disposition and connection of which will hereinafter be described in greater detail. These guide rods serve to engage a guide member generally indicated in FIG. 2 at 66.

FIG. 3 diagrammatically illustrates cage 26 with the front frame 28 displaced to a position below the rear frame 30. It will be appreciated that this relative attitude of the frames is unlike that of FIG. 2 with respect to the collapsed condition of frame 28 in that the front frame 28 is generally at a higher level than the rear of frame 30 as shown by solid lines in FIG. 2.

In comparing FIG. 3 to FIG. 2, it will be appreciated that the two conditions (i.e. open and closed) illustrated in FIG. 2 determine the two limits of relative positional attitudes which will exist for the front and rear frames 28 and 30 and that the relative attitude illustrated in FIG. 3 lies outside of these limits and the range established by these limits. It will also be appreciated that the angular disposition of the lateral members 60 relative to frames 28 and 30 in FIG. 2 lie within a range exclusive of the angular relationship illustrated in FIG. 3.

More particularly, in FIG. 3, lateral members 60, which are parallel to one another, are at an angle A relative to rear frame 30 which angle exceeds the approximately 0 to 90° range illustrated in FIG. 2. Angle A, which will be hereinafter alluded to in greater detail, may also be referred to its supplemental angle C, as also appears in FIG. 3.

FIG. 4 illustrates in greater detail the keyed relationship between, for example, the side portion 36 of front frame 28 and lateral members 60 as well as this same relationship between said lateral members and the side portion 42 of rear frame 30.

In FIG. 4 are particularly illustrated the rectilinear arrays of evenly spaced keyway holes 68, each of which consist, in the preferred embodiment, of a central circular portion 70 and two diametrally opposed radial slots 72 and 74.

Said slots 72 and 74 have a predetermined relationship with the axis of the corresponding frame. This relationship is indicated in the form of angle D which is equal to the angle C of FIG. 3. This relationship is preferably consistent throughout the frames 28 and 30 as appears in the drawing.

The lateral members 60 as shown in FIG. 4 generally include a rectilinear main portion 76 having thereon perpendicular extremities 78 and 80 whereon are preferably provided diametrally opposed fins 82 and 84 cooperatively constituting a flatted portion in the respective extremities. Said fins are preferably aligned with or parallel to the corresponding main portion.

The fins are adapted for insertion through the slots 72 and 74 in the related frames when said frames are appropriately disposed at the correct angle relative to the lateral members. When the fins and the corresponding extremities on the lateral members 60 are inserted through the keyway holes 68, any change in angular disposition of these elements will serve to lock the lateral members to the frames.

Fins 82 and 84 are spaced from main portions 76 as indicated at 86 by a distance which is sufficient to accommodate the wall thickness of the tubes from which the front and back frames 28 and 30 are fabricated. This is best illustrated in FIG. 5 wherein is indicated a distance S which exceeds the thickness T of the wall of the tubing by an amount which is sufficient to permit pivotal movement without too great an axial play.

FIG. 5 further illustrates the uppermost lateral member 60, the free extremity 88 of which extends through a further hole 90 in the tubular element for purposes of further support.

It will also be seen in FIG. 5 that the diametral dimension of the aforesaid flatted portion exceeds the diameter of the circular portion of the slotted keyway to prevent detachment of the lateral member 60 from the corresponding frames other than when the fins are substantially exactly aligned with the aforesaid slots.

It will be appreciated that other cooperating key means are possible within the scope of the invention and that the illustrated form represents a preferred embodiment only. Other possible arrangements within the scope of the invention include elliptical keyways and corresponding extremities on the lateral members 60 as well as other configurations which permit assembly and disassembly within limited ranges of relative positions between the frames and cooperating lateral members.

The keyed pivotal connection provided between the front and back frames and the lateral members is also provided between the collapsible cage and the support frame 10 (see FIG. 1), a pivot 92 being illustrated in FIG. 4 for this purpose. Said pivot 92 is one of two pivots provided in corresponding positions on corresponding lateral members on opposite sides of the cage.

Each of said pivots 92 is provided with diametrally opposed radially extending fins 94 and 96 having an angular relationship such as previously set forth above for cooperation with operatively associated keyway holes.

The relationship of the various described elements of the collapsible cage, which is required for assembling the various components, is as illustrated in FIG. 3 and as also illustrated in FIG. 4. This relationship lies outside the normally operative range of the aforesaid collapsible cage. To prevent these elements from becoming accidentally detached from one another, provision is made in accordance with the invention to restrict the collapsible cage from moving into the position illustrated in FIGS. 3 and 4 after the cage has once been assembled.

In accordance with the invention, this restriction is effected by means serving still another purpose with respect to the operation of the illustrated structure. More particularly, the restricting means takes the form of guide elements which are provided to guide the movement of the collapsible cage relative to the supporting frame 10 when the cage is being moved between its open and collapsed condition.

FIG. 6 illustrates by way of example and in section the leg 16 of support frame 10 and operatively associated therewith the guide rod 62 which extends in spaced and parallel relationship therealong.

One extremity 98 of said guide rod is in the form of a hood having hooked engagement through a hole provided in the leg 62 is perpendicularly related to the main rectilinear portion 102 of said guide rod and is accommodated by friction locking device 104 arranged in a further hole in the leg 16 for purposes of retaining said extremity 100.

It will be appreciated that guide rod 62, as is its counterpart (not shown) in the other leg of frame 10, may be thus put into position in substantially permanent manner without deformation or welding. It will also be understood that guide rod 62 may be employed to entrap loop 104 forming one of the two extremities of the guide member 66 which has been previously indicated as being disposed at the bottom of the front frame 28 and the lattice thereof.

By means of guide rod 62 and cooperating loops 104, the general movement of the front frame 28 is predetermined as indicated by arrow 106 and is limited as established by the positions of extremities 98 and 100 of the guide rod 62. This limited movement will accommodate movement of the cage 26 between its open and collapsed conditions but will prevent the cage 26 from assuming the condition illustrated in FIG. 3, so that once the rods 62 are put into position, it will thereafter be impossible to detach lateral members 60 from the frames 28 and 30 unless the guide rods 62 and 64 are deliberately detached from the support frame 10.

It will be appreciated that the angles C and D of FIGS. 3 and 4 may vary within wide ranges while being effective to enable the achieving of the features and benefits noted hereinabove. Generally, however, the angles will be limited to within a range of from 5°–80° and preferably to within the range of 10°–30° for purposes of manufacture.

In addition to the above, it will be understood that the collapsible cart of the invention is provided with wheels 110 and 112 (see FIG. 1) for support and mobility. To this end the rear frame 30 is provided with a wheel-bearing horizontal axle member 114 on which said wheels are supported.

In keeping with the general provisions of the invention, said wheels are preferably detachable and a preferred mode of attachment is shown in FIGS. 7 and 8 wherein the axle member 114 is shown as including an inwardly directed tongue 116 which engages in annular grooves 118 formed in a rod 120 constituting the wheel support. Said rod 120 may be provided with annular grooves 122 accommodating a circular ring 124 serving to lock the associated wheel on the rod 120.

The latter said structure enables the wheels 110 and 112 to be provided separately for subsequent assembly by the user. At the same time, the rods 120 at the opposite ends may also be detached to reduce substantially the size of the carton or package in which the collapsible cart is supplied.

From what has been stated hereinabove, it will be appreciated that the lateral wire members of the invention are adapted for assuming angular relationships with the front and back frames 28 and 30 within a determinable normal angular range and that key means are provided which permit attachment of these component parts outside of said range, after which movement is restricted to said range by an assembly technique which does not require deformation of the elements which are thusly assembled.

The method of the invention involves relating the elements in the general form and relationships indicated in FIG. 3 and thereafter restricting the movement of these component parts to prevent detachment thereof.

Finally, the structure of the invention includes a bottom 126 in the form of a lattice or the like, said bottom lattice including loops such as indicated at 128 which engage the axle member 114 at the rear and the guide member 66 at the front of the cart. The thusly engaged bottom 126 will not interfere with the aforesaid pivotal relationships.

There will now be obvious to those skilled in the art many modifications and variations of the structure described. These modifications and variations will not depart from the scope of the invention if defined by the following claims.

What is claimed is:

1. A collapsible cart comprising pivotally connected members constituting a collapsible cage and detachable from one another upon assumption of a predetermined angular relationship, and guide means operatively associated with said members to limit relative movement between said pivotally connected members to exclude said predetermined relationship and to establish open and closed conditions for said cage.

2. A collapsible cart comprising a support frame, a collapsible cage adjustable between open and collapsed conditions, means pivotally connecting said cage to said frame whereon said cage is adjustable between said conditions, said means and frame including cooperating key means locking the same together but permitting detachment of the same on assumption of a predetermined positional relationship therebetween, and means on said cage and frame to guide said cage between the open and collapsed conditions thereof while preventing the assuming of said predetermined positional relationship.

3. A collapsible cart comprising a frame and collapsible cage means supported on said frame, said cage means including a front member, a back member and connecting members connecting said front and back members for relative movement towards and away from each other throughout a determinable range of positions, key means connecting said connecting members to said front and back members within said determinable range and enabling detachment of said connecting members from the front and back members outside of said range, and means to restrict the relative movement of said front and back members to said range.

4. A collapsible structure comprising first and second relatively displaceable members, means pivotally connecting said members and being detachable therefrom upon the assumption by said members of a predetermined positional relationship, said means being adapted to connect said members through a range of positional relationships inclusive of said predetermined relationship, and means to limit the relative movement of said members to a subrange excluding said predetermined relationship.

5. A collapsible cart comprising a support frame, a collapsible cage connected to said support frame, said cage including front and back members, lateral members pivotally engaged with said front and back members to permit the latter to be displaced towards and away from each other to permit said cage to be collapsed, wheels on said cage, a guide member on said cage, a bottom pivotally engaging said front and back members, guide means on said support frame, said guide member having a limited path of movement in said guide means, said lateral members assuming, in accordance with the movement of said guide member in said guide means, different angular relationships with said front and back members within a determinable angular range, said front and back and lateral members including cooperating key means pivotally connecting the lateral members to the front and back members and having an angular relationship which locks said front, back and lateral members together and prevents detachment of said lateral members from said front and back members with the angular relationship of said lateral members and front and back members being restricted to said determinable angular range.

6. For a collapsible shopping cart: a collapsible cage comprising generally vertical, front and back U-shaped tubular frames each including a horizontal top portion and rectilinear vertical side portions depending therefrom, wire lattices on said front and back frames for purposes of article retention, said side portions being provided with corresponding rectilinear arrays of evenly spaced keyway holes having central circular portions and diametrally opposed slots extending from the central portions and disposed at a predetermined angle to the corresponding side portions, substantially rigid lateral wire members operatively associated with said front and back frames and adapted to constitute therewith a box-like structure having a right quadrilateral cross-section, said lateral wire members further being pivotally engaged with said front and back frames to permit the latter to be displaced towards and away from each other to permit said cage to be collapsed, said wire members each including a rectilinear main portion, perpendicular extremities on said main portion and diametrally opposed fins on said extremities and adapted for insertion through the slots in the keyway holes and to retain said extremities in engagement with said front and back frames, a bottom lattice coupled to said frames and constituting a bottom for said cage, said lateral wire members being adapted for assuming different angular relationships with said front and back frames and means to limit said relationships to a determinable angular range, said fins and corresponding slots having an angular relationship such as to prevent detachment of said wire members from said front and back frames with the angular relationship of said wire members and front and back frames being restricted to said determinable angular range.

7. A collapsible shopping cart comprising a support frame; a collapsible cage connected to said frame, said cage including front and back tubular frames each including side portions provided with spaced keyway holes, lateral wire members pivotally engaged with said front and back frames to permit the latter to be displaced towards and away from each other to permit said cage to be collapsed, said wire members each including extremities in turn including fins adapted for insertion through the keyway holes to retain said wire members in engagement with said front and back frames while permitting pivotal movement therebetween, a wheel bearing axle member on the back frame, wheels on said axle member, a guide member on the front frame, a bottom pivotally connected to said front and back frames, a guide on the said support frame, said guide member being retained in said guide, said guide member having a limited path of movement in said guide, said lateral wire members assuming, in accordance with the movement of said guide member in said guide, different angular relationships with said front and back frames within a determinable angular range, said fins and keyway holes having an angular relationship which prevents detachment of said wire members from said front and back frames with the angular relationship of said wire members and front and back frames being restricted to said determinable angular range.

8. A collapsible shopping cart comprising an inverted U-shaped tubular support frame including a generally central portion constituting a handle and two legs depending from said central portion, a collapsible cage positioned between said legs and pivotally connected thereto, said cage including front and back U-shaped tubular frames each including a top portion and side portions depending therefrom, wire lattices on said front and back frames for purposes of article retention, said side portions being provided with corresponding arrays of spaced keyway holes having central circular portions and slots extending from the central portions and disposed at a predetermined angle to the corresponding side portions, lateral wire members operatively associated with said front and back frames and adapted to constitute therewith a structure having a right-quadrilateral cross-section, said lateral wire members further being pivotally engaged with said front and back frames to permit the latter to be displaced towards and away from each other to permit said cage to be collapsed, said wire members each including a main portion, angular extremities on said main portion and fins on said extremities and adapted for insertion through the slots in the keyway holes and to retain said extremities in engagement with said front and back frames, the legs of said support frame being provided with aligned keyway openings having a circular central portion and radial slots extending therefrom, pivot pins in corresponding positions on corresponding lateral members on opposite sides of said cage, radial fins on said pivot pins whereby said pins are insertable through the slots in the legs of the support frame and retained in pivotal relationship therewith to connect said cage to said support frame, a wheel bearing axle member extending between and beyond the legs of the back frame and connected with the latter, wheels on said axle member, a guide member parallel to said axle member and extending between and beyond the legs of the front frame, a bottom lattice pivotally engaging said axle and guide members and constituting a bottom for said cage, guide rods in corresponding positions on the legs of said support frame and extending in spaced relation to the latter said legs, said guide member extending between the rods and latter said legs, said rods defining with the latter said legs guideways within which said guide member has a limited path of movement along the latter said legs, said lateral wire members assuming, in accordance with the movement of said guide member in said guideways, different angular relationships with said front and back frames within a determinable angular range, said fins and corresponding slots having an angular relationship such as to prevent detachment of said wire members from said front and back frames and of said cage from said support frame with the angular relationship of said wire members and front and back frames being restricted to said determinable angular range.

9. A collapsible shopping cart comprising an inverted U-shaped tubular support frame including a generally horizontal central portion constituting a handle and two legs depending from said central portions, said legs including downwardly directed free end portions, caps on said free end portions; a collapsible cage positioned between said legs and pivotally connected thereto, said cage including generally vertical front and back U-shaped tubular frames each including a horizontal top portion and rectilinear vertical side portions depending therefrom, wire lattices on said front and back frames for purposes of article retention, said side portions being provided with corresponding rectilinear arrays of evenly spaced keyway holes having central circular portions and diametrally opposed slots extending from the central portions and disposed at a predetermined angle to the corresponding side portions, substantially rigid lateral wire members operatively associated with said front and back frames and adapted to constitute therewith a boxlike structure having a right-quadrilateral cross-section, said lateral wire members further being pivotally engaged with said front and back frames to permit the latter to be displaced towards and away from each other to permit said cage to be collapsed, said wire members each including a rectilinear main portion, perpendicular extremities on said main portion and diametrally opposed fins on said extremities and adapted for insertion through the slots in the keyway holes and to retain said extremities in engagement with said front and back frames, said fins being aligned with said main portions, the legs of said support frame being provided with aligned keyway openings having a circular central portion and radial slots extending therefrom, pivot pins in corresponding positions on corresponding lateral members on opposite sides of said cage, radial fins on said pivot pins whereby said pins are insertable through the slots in the legs of the support frame and retained in pivotal relationship therewith to connect said cage to said support frame, a wheel bearing horizontal axle member extending between and beyond the legs of the back frame and connected with the latter, wheels on said axle member, a horizontal guide member parallel to said axle member and extending between and beyond the legs of the front frame, said guide member including free extremities in the form of loops, a bottom lattice including loops pivotally engaging said axle and guide members and constituting a bottom for said cage, guide rods in corresponding positions on the legs of said support frame and extending parallel to and spaced from the latter said legs, said rods including extremities connected with the latter said legs, said guide member extending between the rods and latter said legs and being retained therein by said loops, said rods defining with the latter said legs guideways within which said guide member has a limited path of movement along the latter said legs, said lateral wire members, assuming, in accordance with the movement of said guide member in said guideways, different angular relationships with said front and back frames within a determinable angular range, said fins and corresponding slots having an angular relationship such as to prevent detachment of said wire members from said front and back frames and of said cage from said support frame with the angular relationship of said wire members and front and back frames being restricted to said determinable angular range.

10. A cart as claimed in claim 9 wherein said axle member comprises a hollow tube including opposite end portions in turn including inwardly protruding tongues, and rods extending into said end portions and being provided with annular grooves in which said tongues engage, said wheels being mounted on the latter said rods.

11. A cart as claimed in claim 9 wherein the legs of said support are provided with spaced holes, one of the extremities of each of said guide rods having the form of a hook and being engaged on one of the latter said holes, the other of the extremities being generally perpendicular to the corresponding leg of the support frame and extending into the other of the latter said holes, and a locking member locking the latter said extremity in the latter said hole.

12. A cart as claimed in claim 9 wherein the slots in the legs of the tubular frames are at a 5–85° angle to the corresponding legs.

13. A cart as claimed in claim 12 wherein the slots in the legs of the tubular frames are at a 10–30° angle to the corresponding legs.

References Cited by the Examiner
UNITED STATES PATENTS

| | | | |
|---|---|---|---|
| 2,913,249 | 11/59 | Welsh | 280—36 |
| 2,920,900 | 1/60 | Best | 280—36 |

ARTHUR L. LA POINT, *Primary Examiner.*